United States Patent
Wei et al.

(10) Patent No.: US 10,055,352 B2
(45) Date of Patent: Aug. 21, 2018

(54) PAGE CACHE WRITE LOGGING AT BLOCK-BASED STORAGE

(71) Applicant: Amazon Technologies, Inc., Reno, NV (US)

(72) Inventors: Danny Wei, Seattle, WA (US); John Luther Guthrie, II, Seattle, WA (US); James Michael Thompson, Seattle, WA (US); Benjamin Arthur Hawks, Seattle, WA (US); Norbert P. Kusters, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 772 days.

(21) Appl. No.: 14/205,067

(22) Filed: Mar. 11, 2014

(65) Prior Publication Data
US 2015/0261674 A1  Sep. 17, 2015

(51) Int. Cl.
*G06F 12/0866* (2016.01)
*G06F 11/14* (2006.01)

(52) U.S. Cl.
CPC .......... *G06F 12/0866* (2013.01); *G06F 11/14* (2013.01)

(58) Field of Classification Search
CPC ............................. G06F 12/0866; G06F 11/14
See application file for complete search history.

(56) References Cited

U.S. PATENT DOCUMENTS

| | | |
|---|---|---|
| 7,778,972 B1 | 8/2010 | Cormie et al. |
| 7,979,652 B1 | 7/2011 | Sivasubramanian et al. |
| 8,307,359 B1 | 11/2012 | Brown et al. |
| 8,341,115 B1 | 12/2012 | Natanzon et al. |
| 8,578,083 B2 | 11/2013 | Chandrasekaran et al. |
| 2005/0027718 A1 | 2/2005 | Sakaguchi et al. |
| 2005/0203974 A1 | 9/2005 | Smith et al. |

(Continued)

FOREIGN PATENT DOCUMENTS

| | | |
|---|---|---|
| JP | Hei09-0026916 | 1/1997 |
| JP | 2005050165 | 2/2005 |

(Continued)

OTHER PUBLICATIONS

International Search Report and Written Opinion for PCT/US15/19574, dated Aug. 28, 2015, Amazon Technologies, Inc., pp. 1-12.

(Continued)

*Primary Examiner* — Eric Cardwell
(74) *Attorney, Agent, or Firm* — Robert C. Kowert; Meyertons, Hood, Kivlin, Kowert & Goetzel, P.C.

(57) ABSTRACT

A block-based storage system may implement page cache write logging. Write requests for a data volume maintained at a storage node may be received at a storage node. A page cache for may be updated in accordance with the request. A log record describing the page cache update may be stored in a page cache write log maintained in a persistent storage device. Once the write request is performed in the page cache and recorded in a log record in the page cache write log, the write request may be acknowledged. Upon recovery from a system failure where data in the page cache is lost, log records in the page cache write log may be replayed to restore to the page cache a state of the page cache prior to the system failure.

19 Claims, 14 Drawing Sheets

(56) References Cited

U.S. PATENT DOCUMENTS

| | | |
|---|---|---|
| 2006/0230074 A1 | 10/2006 | Everhart et al. |
| 2011/0022801 A1 | 1/2011 | Flynn |
| 2011/0276963 A1 | 11/2011 | Wu et al. |
| 2011/0307736 A1 | 12/2011 | George et al. |
| 2012/0079229 A1 | 3/2012 | Jensen et al. |
| 2012/0272240 A1 | 10/2012 | Starks et al. |
| 2013/0007219 A1 | 1/2013 | Sorenson, III et al. |
| 2013/0042056 A1* | 2/2013 | Shats .................. G06F 12/0246 711/103 |
| 2013/0042156 A1 | 2/2013 | Srinivasan et al. |
| 2013/0151467 A1 | 6/2013 | Krishnan et al. |
| 2013/0166831 A1* | 6/2013 | Atkisson ............. G06F 12/0802 711/103 |
| 2013/0198738 A1 | 8/2013 | Reddin et al. |
| 2013/0262405 A1 | 10/2013 | Kadatch et al. |

FOREIGN PATENT DOCUMENTS

| | | |
|---|---|---|
| JP | 2006012142 | 1/2006 |
| JP | 2006285991 | 10/2006 |
| JP | 2012-524947 | 10/2012 |
| WO | 2010/124024 | 10/2010 |
| WO | 2012125315 | 9/2012 |
| WO | 2013024485 | 2/2013 |

OTHER PUBLICATIONS

U.S. Appl. No. 14/204,916, filed Mar. 11, 2014, Danny Wei.

Extended European Search Report from PCT/US2015/019574, dated Oct. 17, 2017, Amazon Technologies, Inc., pp. 1-9.

Office Action from Korean Patent Application No. 10-2016-7027931, dated Aug. 21, 2017 (English translation and Korean version), Amazon Technologies, Inc., pp. 1-11.

Office Action from Japanese Patent Application No. 2016-556704, dated Aug. 8, 2017 (English translation and Japanese version), Amazon Technologies, Inc., pp. 1-10.

Written Opinion from Singapore Application No. 11201606896X, dated Sep. 16, 2017, Amazon Technologies, Inc., pp. 1-5.

* cited by examiner

PAGE CACHE WRITE LOGGING AT BLOCK-BASED STORAGE

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. However, as network transmission capabilities increase, along with greater processing capacity for virtualized resources, I/O demands upon block-based storage may grow. If I/O demands exceed the capacity of block-based storage to service requests, then latency and/or durability of block-based storage performance for virtualized computing resources suffer.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement page cache write logging for block-based storage. Block-based storage systems typically implement page caches to store quickly (in system memory) updates to data volumes maintained in the page cache. Eventually the page cache may be flushed to block-based storage devices to update persistent storage. However, as system memory is not persistent in the event of a system failure, writes that are only stored in the page cache are not durable and may be lost. Page cache write logging may be implemented at storage nodes to preserve the state of the page cache in the event of a failure causing a loss of data in the page cache. In some embodiments, page cache write logging may be implemented selectively for different data volumes maintained at a same storage system. Durability properties for respective data volumes describing whether or not page cache write logging is enabled or disabled for a corresponding data volume may be dynamically modified according to various conditions at the storage system, such as a rate of incoming write requests that are to be logged in a page cache write log.

Figure 1:
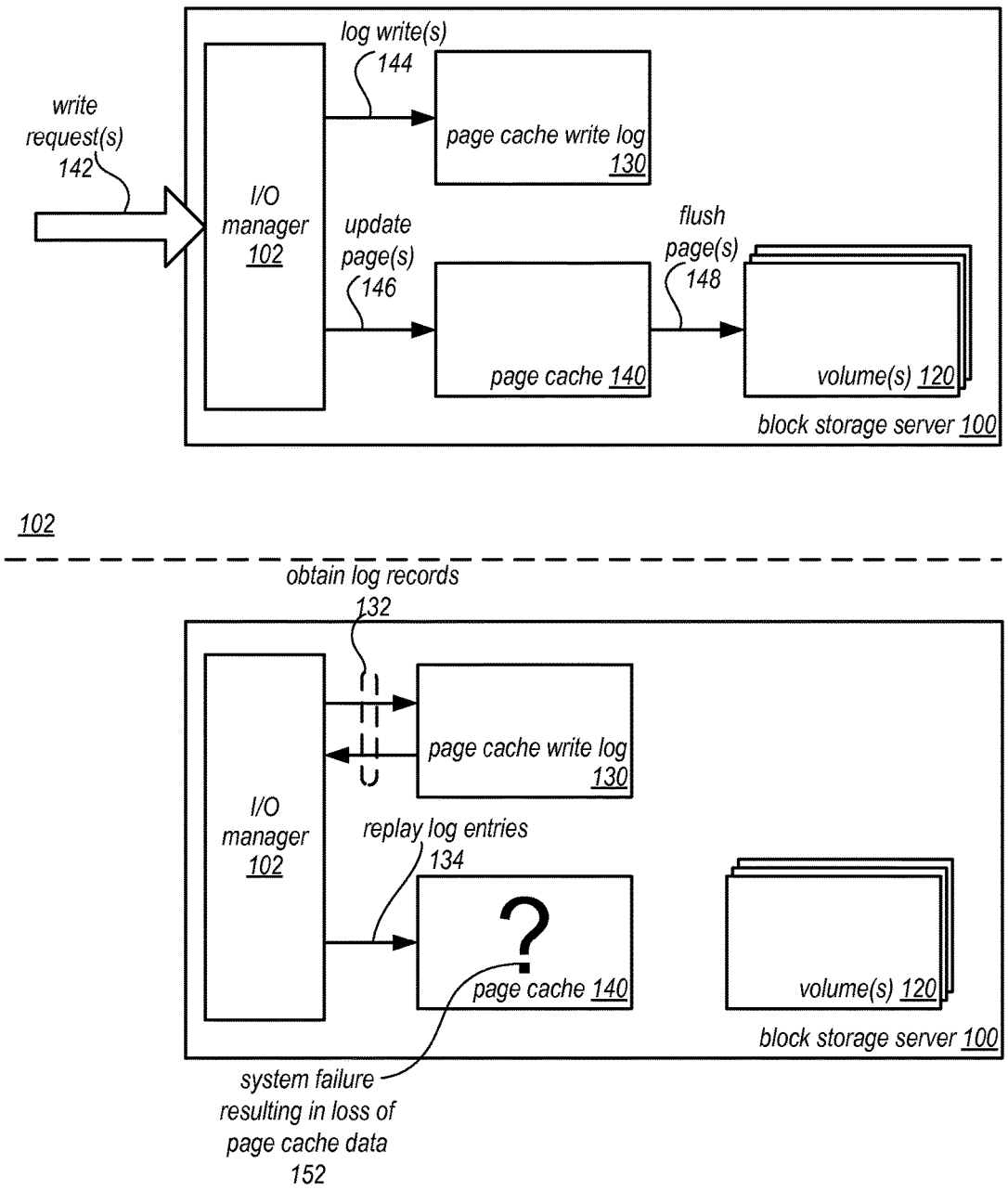
FIG. 1 is a series of block diagrams illustrating page cache write logging at block-based storage, according to some embodiments.

FIG. 1 is a series of block diagrams illustrating page cache write logging at block-based storage, according to some embodiments. As indicated at 102 a block storage server 100 (which may be a general computing system, such as system 2000 described below with regard to FIG. 14) may store data volumes 120 on one or more block-based storage devices attached to the block-storage server. As write requests 142 for the data volumes 120 are received, I/O manager 102 may send in or near parallel updates to respective pages or entries 146 in page cache 140 and log records written 144 to page cache write log 130, which may be implemented on a persistent storage device, (which may be separate from the block-based storage devices storing volumes 120). Log records may, in various embodiments, describe an update to a particular page or entry of page cache 140. Log records may be stored in page cache write log 130 sequentially, in some embodiments. In response to storing the log records 144 and updating the page cache 146, the write requests may be acknowledged. At a later time pages in the page cache may be flushed 148 to update the volumes 120 in the block-based storage devices. In some embodiments, log records stored in page cache write log 130 may be removed or trimmed based on flush operations 148 from the page cache such that log records describing updates to the page that are made persistent in volume(s) 120 may be reclaimed and made available to store additional log records.

As illustrated at scene 104, a system failure 152 results in the loss of page cache data. Thus, write requests in the page cache data are lost as they may have not been flushed to the volume(s) 120 in persistent storage. I/O manager 132 may, in some embodiments, obtain log records 132 from page cache write log 130 and replay the updates 134 to the page cache to restore the state of the page cache prior to the system failure, resulting in a recovery of the page cache data.

In some embodiments, page cache write logging may be implemented on a per volume basis. For example, in some embodiments, a durability property for a data volume which indicates whether or not page cache write logging is enabled may be dynamically modified to adjust to changing conditions at the storage node. For example, I/O manager 102 may monitor a rate of incoming write requests that are to be logged in page cache write log 130, and dynamically modify one or more durability properties for a respective one or more data volumes 120, in some embodiments. If, for instance, page cache write logging is disabled for a particular data volume 120, then write requests 142 directed to the data volume may be completed (e.g., page cache 140 updated) without storing a log record describing the update in page cache write log. Similarly, if page cache write logging is enabled, then write requests received subsequent to the enablement of page cache write logging may, as illustrated in scene 102, have both updates to the page cache 140 performed and log records stored in the page cache write log 130 prior to acknowledging a write as complete. Recovery operations for data volumes with different durability properties may vary, in some embodiments, with those data volumes with page cache write logging enabled made available to receive new write requests more quickly or with less subsequent recovery operations than those data volumes with page cache write logging disabled.

Please note that previous descriptions are not intended to be limiting, but are merely provided as an example of page cache write logging at block-based storage. Various other components may instigate or participate in logging, recovery, or processing write requests. Other differences, for example, such as the number of storage nodes, data volumes, or durability schemes (e.g., replicating a data volume on multiple nodes) may also be different than illustrated in FIG. 1.

This specification begins with a general description of a block-based storage service provider, which may implement page cache write logging and dynamically modifying durability properties for data volumes. Then various examples of a block-based storage service provider are discussed, including different components/modules, or arrangements of components/module that may be employed as part of a block-based storage provider. A number of different methods and techniques to implement page cache write logging and dynamically modifying durability properties for data volumes are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
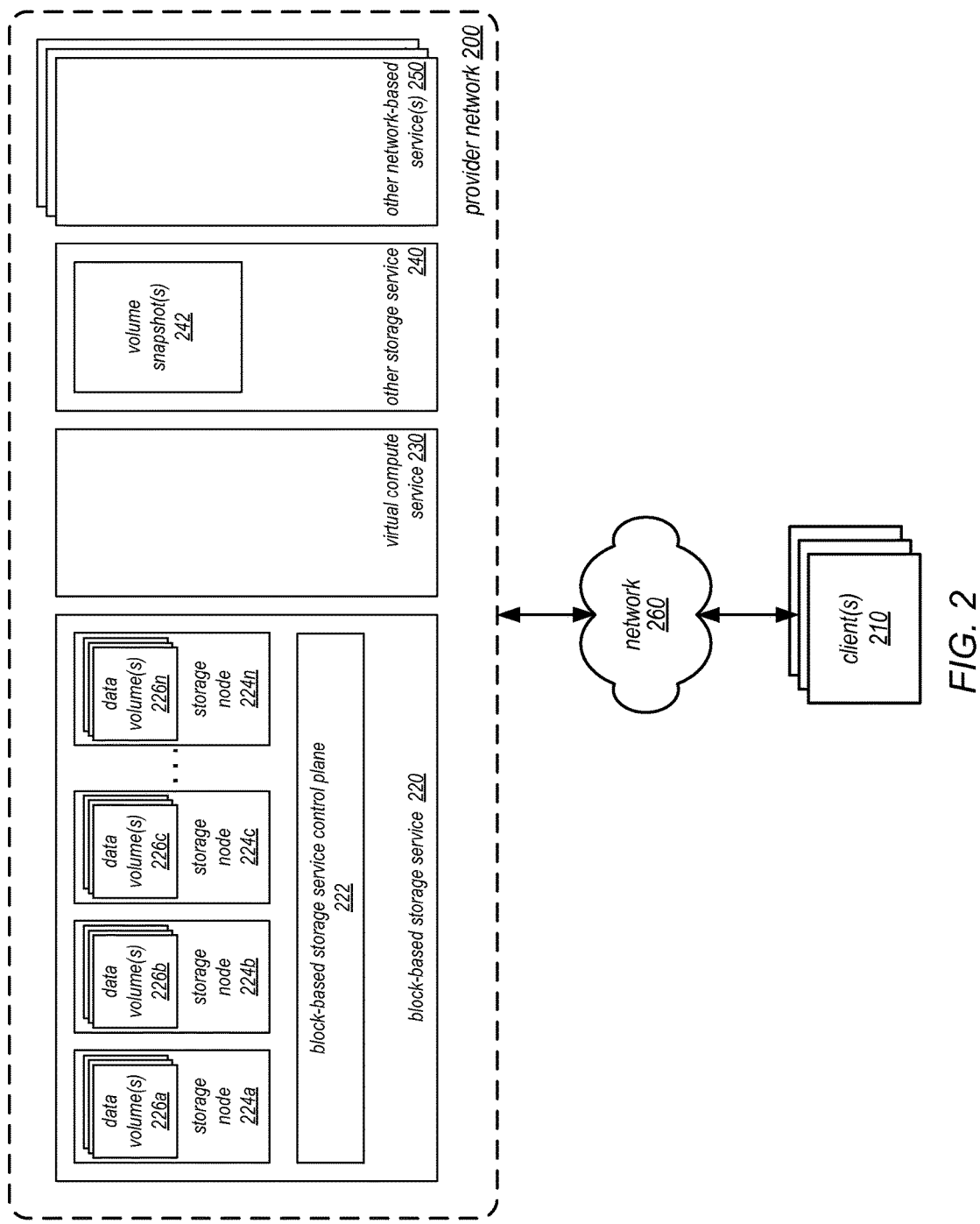
FIG. 2 is a block diagram illustrating a provider network implementing multiple network-based services including a block-based storage service that implements page cache write logging at storage nodes, according to some embodiments.

FIG. 2 is a block diagram illustrating a provider network implementing multiple network-based services including a block-based storage service that implements optimized write performance during snapshot operations, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including general purpose or special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent storage nodes 224a, 224b, 224c through 224n(e.g., server block data storage systems), which provide block level storage for storing one or more sets of data volumes data volume(s) 226a, 226b, 226c, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations.

A volume snapshot of a data volume 226 may be a fixed point-in-time representation of the state of the data volume 226. In some embodiments, volume snapshots 242 may be stored remotely from a storage node 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. Block-based storage service control plane 222 may also provide services related to the creation, usage and deletion of volume snapshots 242 on other storage service 240. Block-based storage service control plane 222 may also provide services related to the collection and processing of performance and auditing data related to the use of data volumes 226 and snapshots 242 of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots 242 of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
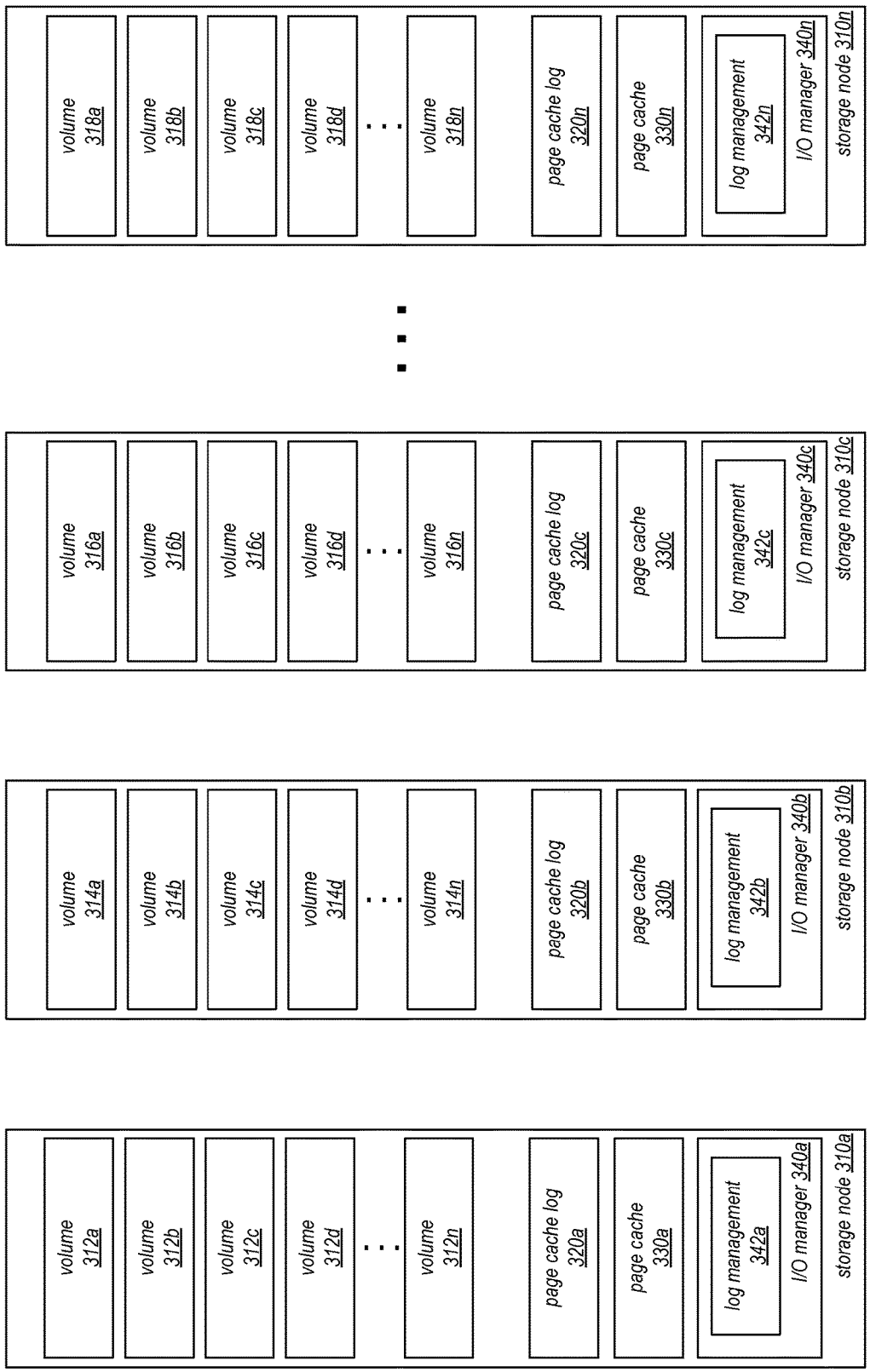
FIG. 3 is a block diagram illustrating storage nodes that implement page cache write logs for updates to page caches implemented at the storage nodes, according to some embodiments.

FIG. 3 is a block diagram illustrating storage nodes that implement page cache write logs for updates to page caches implemented at the storage nodes and dynamically modifying durability properties for data volumes, according to some embodiments. Multiple storage nodes, such as storage nodes 310a, 310b, 310c through 310n, may be implemented in order to provide block-based storage services. A storage node 310 may be one or more computing systems or devices, such as a storage server or other computing system (e.g., computing system 2000 described below with regard to FIG. 14). Each storage node 310 may maintain respective replicas of data volumes. For instance, storage node 310a maintains data volumes 312a, 312b, 312c, 312d through 312n, storage node 310b maintains data volumes 314a, 314b, 314c, 314d through 314n, storage node 310c maintains data volumes 316a, 316b, 316c, 316d through 316n, through storage node 310n maintaining data volumes 318a, 318b, 318c, 318d through 318n. While storage nodes 310 are depicted as having equal numbers of data volumes, numbers of data volumes maintained on storage nodes may vary from storage node 310 to other storage node 310. Some data volumes may differ in size from other data volumes, in some embodiments. Storage nodes 310 may also provide multi-tenant storage. For example, in some embodiments, data volume 316a maintained at storage node 310c may be maintained for one account of block-based storage service 220, while data volume 316b also maintained at storage node 310c may be maintained for a different account. Storage nodes 310 may persist their respective data volumes in one or more block-based storage devices (e.g., hard disk drives, solid state drives, etc.) that may be directly attached to a computing system or device implementing the respective storage node.

Block-based storage service 220 may manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 312a, storage node 310a may serve as a master storage node. A master storage node may, in various embodiments, receive and process requests (e.g., I/O requests) from clients of the data volume. Thus, storage node 310a may then coordinate replication of I/O requests, such as write requests, or any other changes or modifications to data volume 312a to one or more other storage nodes serving as slave storage nodes. For instance, storage node 310c may maintain data volume 316d which is a replica of data volume 312a. Thus, when a write request is received for data volume 312a at storage node 310a, storage node 310a may forward the write request to storage node 310c and wait until storage node 310c acknowledges the write request as complete before completing the write request at storage node 310. Master storage nodes may direct other operations for data volumes, like snapshot operations or other I/O operations (e.g., serving a read request).

Please note, that in some embodiments, the role of master and slave storage nodes may be assigned per data volume. For example, for data volume 312a maintained at storage node 310a, storage node 310a may serve as a master storage node. While for another data volume, such as data volume 312b, maintained at storage node 310a, storage node 310a may serve as a slave storage node.

In various embodiments, storage nodes 310 may each implement a respective page cache. A page cache may be a portion of system memory or other memory device that stores pages or other groupings of data from one of the data volumes 312 maintained a respective storage node. Instead of directly writing to or reading from a block-based storage device maintaining the portion of requested data of a data volume, the page cache may be updated. For example, if a read request is received for a portion of a data volume, it may first be determined whether the data resides in the page cache. If yes, then the data may be read from the page cache. If no, then the data may be retrieved from the respective block-based storage device maintaining the portion of the requested data of the data volume and written into the page cache for future use. Similarly, a write request may be directed toward a data volume maintained in persistent block storage may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, storage nodes 310 may implement respective page cache write logs, such as page cache write logs 320a, 320b, 320c through 320n. Page cache write logs may store log records describing updates to the respective page cache, such as write requests that modify data maintained in the page cache 330. Thus, in the event of a system or other failure that causes a loss of data in the page cache 330, log records in the page cache write log 320 may be used to restore the page cache to a state prior to the failure. Log records may be stored sequentially according to the order in which updates are made to page cache 330, in some embodiments. For example, write request 1A is received, performed, and a corresponding log record 1A is stored. Then write request 1B is received, performed, and a corresponding log record 1B is stored, and so on. By storing log records sequentially, log records may be replayed or re-applied in the order in which they are stored to generate a state of the page cache at a particular point in time.

Moreover, sequential storage of log records may decrease write latency for storing log records. Page cache write logs 320 may be implemented as a persistent storage device (e.g., a hard-disk drive, solid state drive (SSD), or other block-based storage device). In some embodiments, page cache write log 320 may be implemented on a persistent memory device, such as non-volatile random access memory (NV RAM), battery or capacity backed memory, or other types of memristor based resistive random access memory (Re-RAM), three-dimensional NAND technologies, Ferroelectric RAM, magnetoresistive RAM (MRAM), or any of various types of phase change memory (PCM). Sequential writes to such types of persistent storage devices are often faster than random access writes. In various embodiments, page cache write logs 320 may be implemented on a dedicated block storage device for the storage node. The persistent storage device persisting the page cache write log may be separate from block-based storage devices persisting data volumes at a storage node, in some embodiments.

Storage nodes 310 may implement respective I/O managers, such as I/O managers 340a, 340b, 340c through 340n. I/O managers 340 may handle I/O request directed toward data volumes maintained at a particular storage node. Thus, I/O manager 340b may process and handle a write request to volume 314b at storage node 310b, for example. I/O manager 340 may be configured to process I/O requests according to block-based storage service application programming interface (API) and/or other communication protocols, such as such as internet small computer system interface (iSCSI). In some embodiments, I/O managers 340 may implement respective log management components, such as log management 342a, 342b, 342c through 342n. Log management components may perform various log management functions, such as trimming log records and/or performing page cache recovery based, at least in part, on log records, discussed in further detail below with regard to FIGS. 4, 7 and 8.

Figure 4:
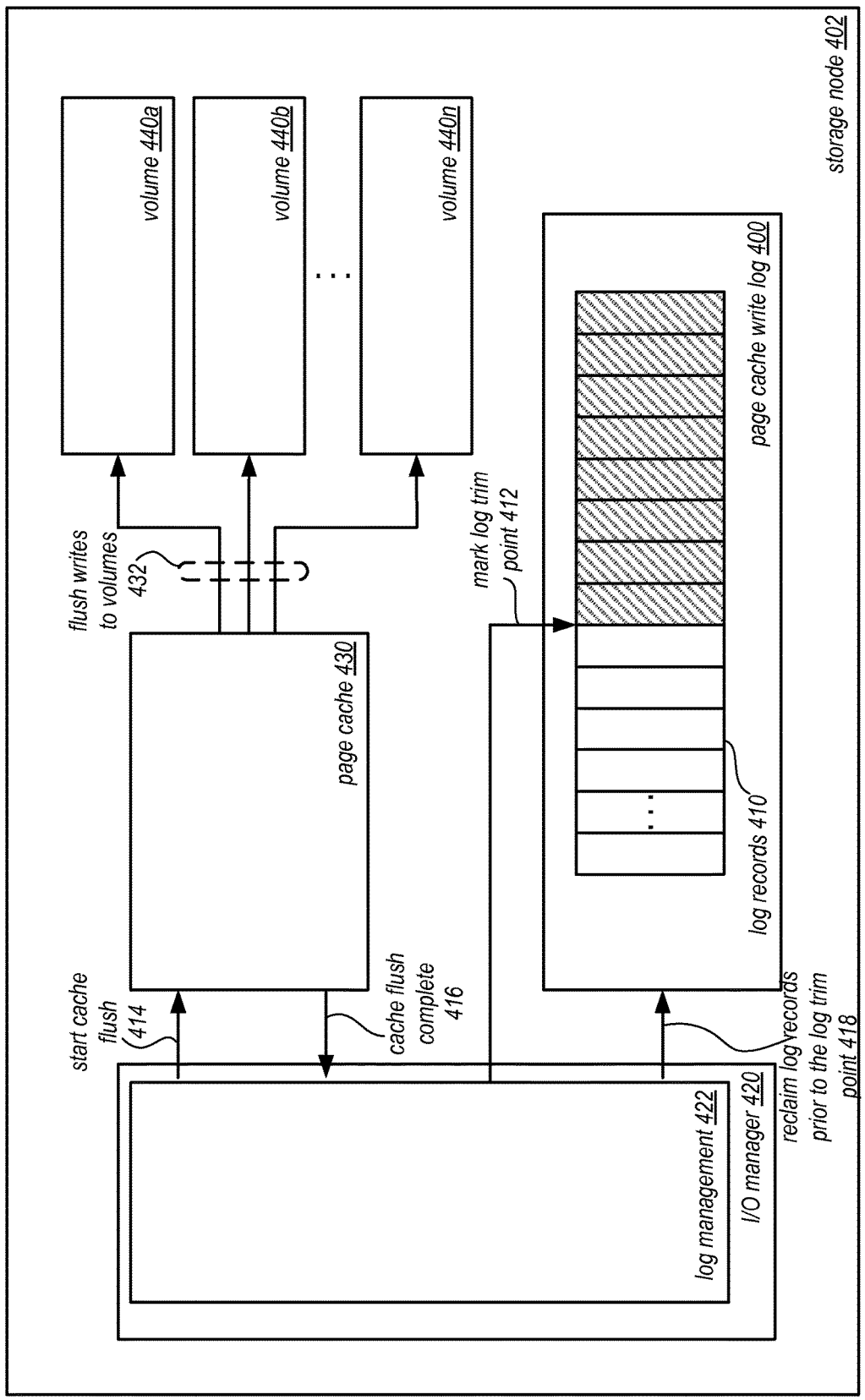
FIG. 4 is a block diagram illustrating a storage node configured to trim log entries in a page cache write log for a page cache at the storage node, according to some embodiments.

FIG. 4 is a block diagram illustrating a storage node configured to trim log entries in a page cache write log for a page cache at the storage node, according to some embodiments. Log management module 422 implemented in I/O manager 420 may control log operations for page cache write log 400 at storage node 402. Log management module 422 may determine when to perform a trimming operation (e.g., detecting a trim event such as discussed below with regard to FIG. 8). Log management module may first mark the trim point in the log 412, such as the point in the log 400 when the trimming operation begins. Log records 410 that are shaded are those log records that were stored prior to the trim point and are thus eligible to be trimmed (as they need not be kept if the page cache is flushed entirely). Log management module 414 may instruct page cache 430 to start a cache flush 414. One or more flush operations may be performed to flush the page cache entries to 432 to the respective block-based storage devices maintaining volumes 440a, 440b, through 440n. Once page cache entries are flushed, the block-based storage devices maintaining data volumes 440 may persistently store the completed write operations previously stored in page cache 430. In some embodiments, log management module 422 may determine a size of flush operations, increasing or decreasing the portions of the page cache flushed at a time. Once the indication that the cache flush is complete 416 is received, the log management module may then reclaim (e.g., delete and mark as available) log records prior to the log trim point 418, freeing up space for additional log records.

Figure 5:
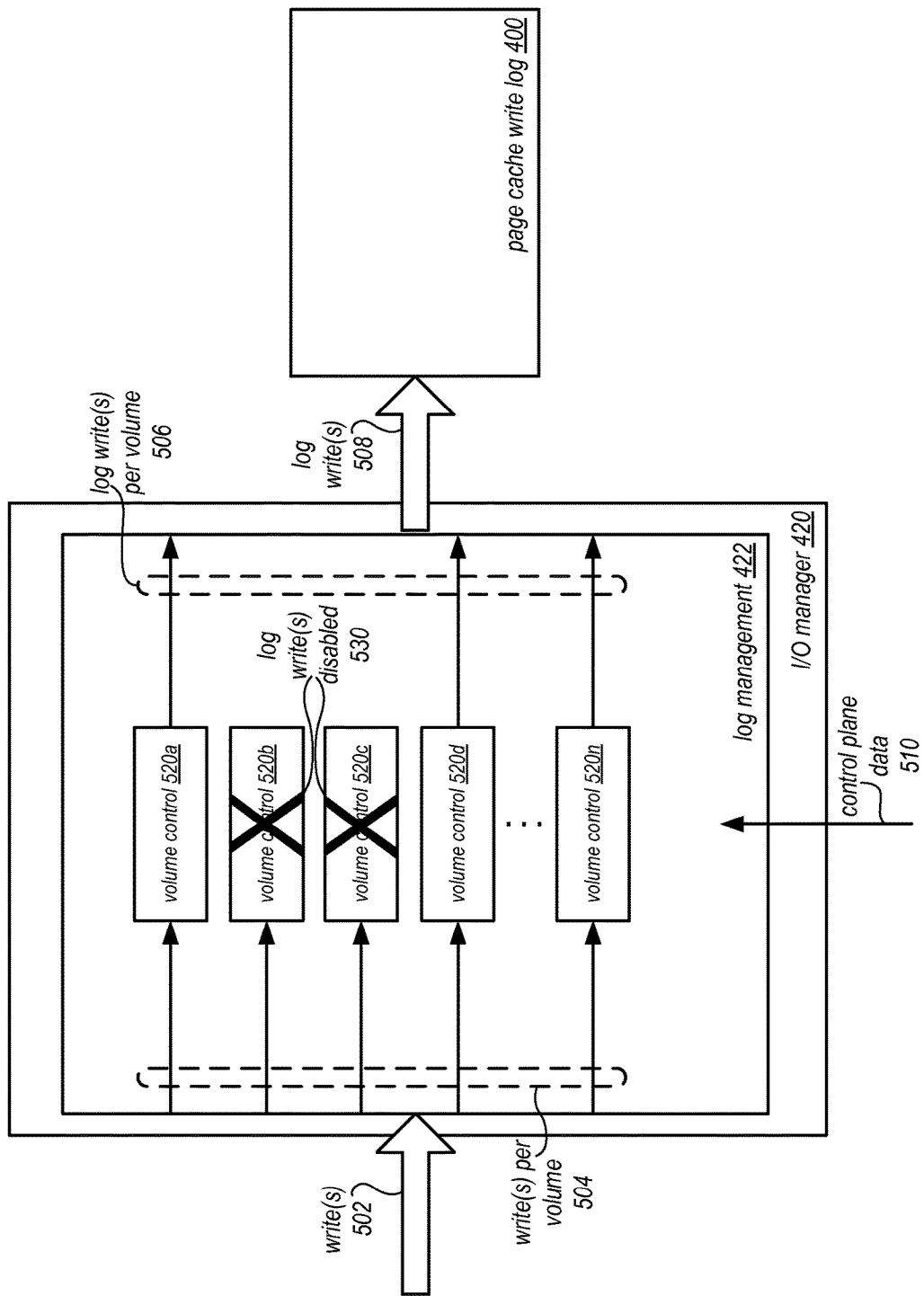
FIG. 5 is a block diagram illustrating dynamically selective page cache write logging for data volumes maintained in block-based storage, according to some embodiments.

FIG. 5 is a block diagram illustrating selective page cache write logging for data volumes maintained in block-based storage, according to some embodiments. As noted above, in some embodiments page cache write logging may be enabled or disabled on a per data volume basis. Write(s) 502 received at I/O manager 420 may be directed through log management module 422. Log management module 422 may be configured to determine whether a durability property for a particular data volume (which indicates whether page cache write logging is enabled or disabled). In the illustrated, example, volume controls 520b and 520c prevent page cache logging for write requests 504 going to the page cache write log 400. While other writes 504 that are directed toward data volumes with a durability property enabled to allow page cache write logging are passed through 506 and written as log records 508 to page cache write log 400.

Figure 10:
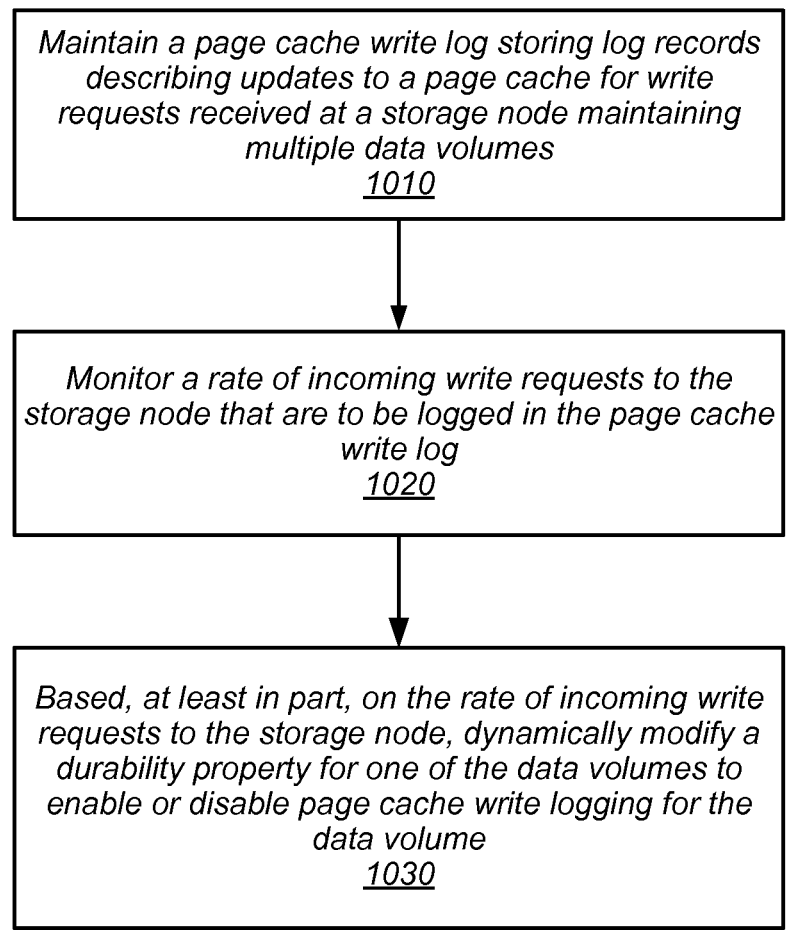
FIG. 10 is a high-level flowchart illustrating various methods and techniques for dynamically modifying durability properties for data volumes maintained at a storage node, according to some embodiments.
Figure 11:
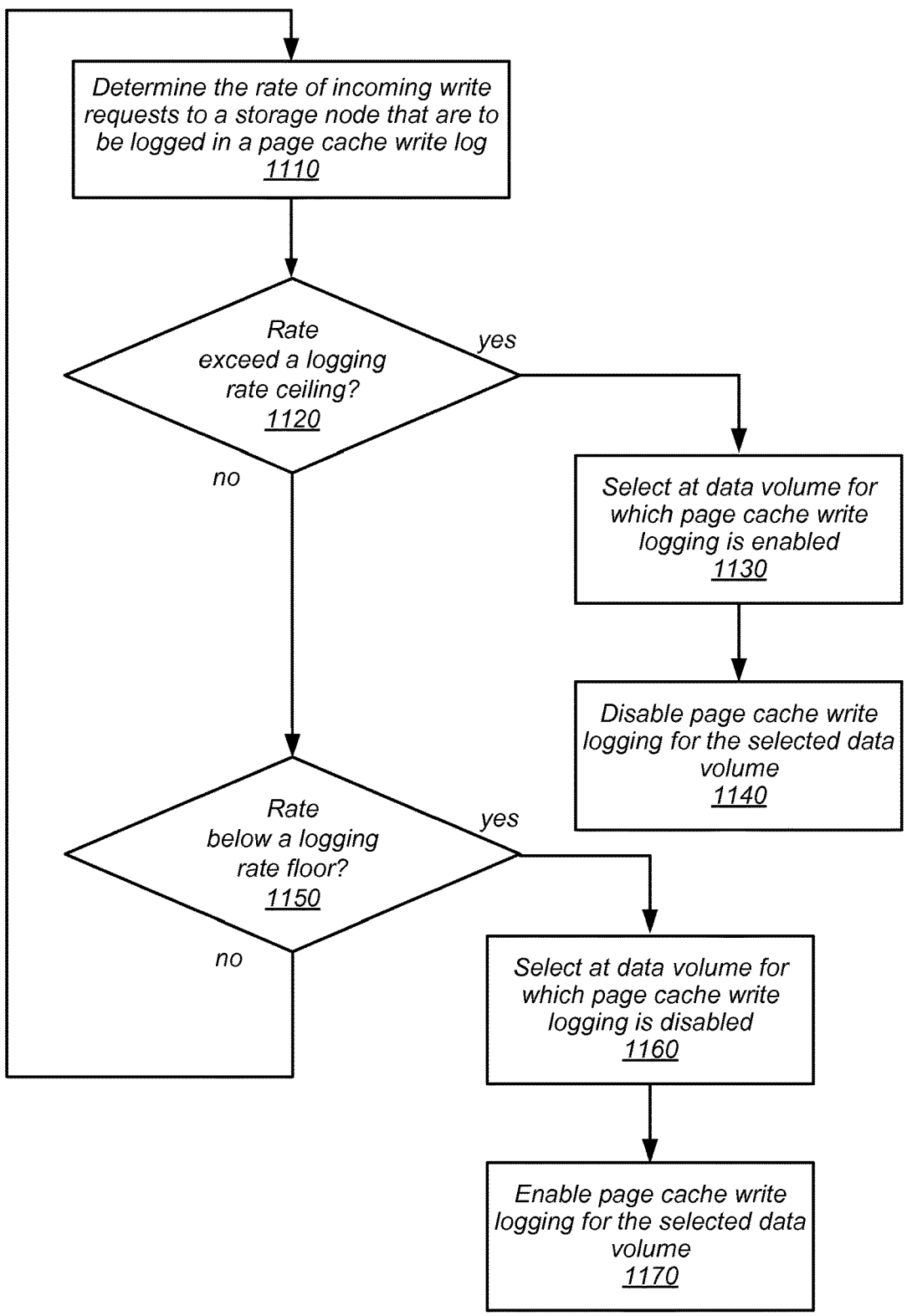
FIG. 11 is a high-level flowchart illustrating various methods and techniques for determining whether to enable or disable page cache write logging for data volumes, according to some embodiments.

In some embodiments, volume log management 422 may perform dynamic modification of durability properties for data volumes, as discussed below with regard to FIGS. 10 and 11. For example, I/O manager 420 and/or log management module 422 may monitor the rate of incoming write requests that are to be logged and dynamically modify the durability properties of one or more data volumes based on the incoming rate. Other data, such as control plane data 510 received at log management 422, may also be used to make dynamic modifications to durability properties for data volumes, such as data that indicates durability properties for other storage nodes maintaining one or more of the same replicas of the data volumes maintained at the storage node.

Figure 6:
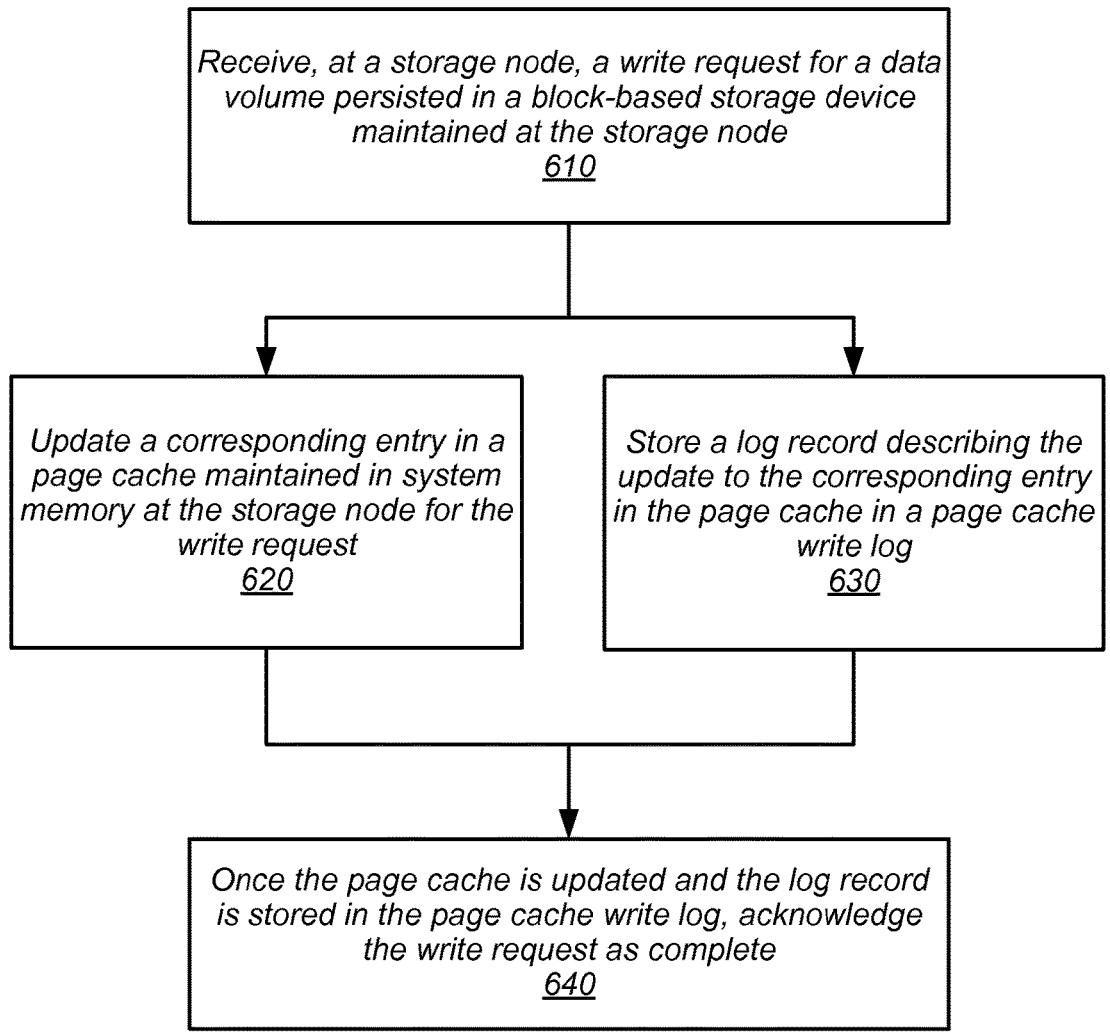
FIG. 6 is a high-level flowchart illustrating various methods and techniques for page cache write logging at block-based storage, according to some embodiments.

The examples of page cache write logging for block-based storage maintaining data volumes discussed above with regard to FIGS. 2-5 have been given in regard to a block-based storage service. Various other types or configurations of block-based storage may implement these techniques. For example, a client of block-based storage (application, operating system, or other component sending write requests for the data volume) may be implemented on a same computing system as the storage node performing a snapshot operation. Different configurations of storage nodes may also implement various numbers of replicas, mirroring, or other durability techniques that may implement page cache write logging performed by the variously configured storage nodes for the data volume. FIG. 6 is a high-level flowchart illustrating various methods and techniques for page cache write logging at block-based storage, according to some embodiments. These techniques may be implemented using one or more storage nodes (or other system component that maintains a data volume in block-based storage) as described above with regard to FIGS. 2-5.

As indicated at 610, a write request for a data volume in a block-based storage device maintained at the storage node may be received, in various embodiments. The write request may write, delete, change or otherwise modify the data volume. A corresponding entry for the modified data may be updated in the page cache in system memory at the storage node for the write request, as indicated at 620. Likewise, in or near-parallel, a log record describing the update to the corresponding entry in the page cache write log may be stored. For example, a log record may include the exact value of the modification or new data, or may include a value from which the update can be derived (e.g., prior value+1). In response to updating the corresponding entry in the page cache and storing the log record describing the update to the corresponding entry in the page cache write log, the write request may be acknowledged as completed, as indicated at 640. The page cache may maintain the updated entry until such a time as the entry has been written to a persistent storage device maintaining the updated portion of the data volume as part of a flush operation, in some embodiments.

Figure 7:
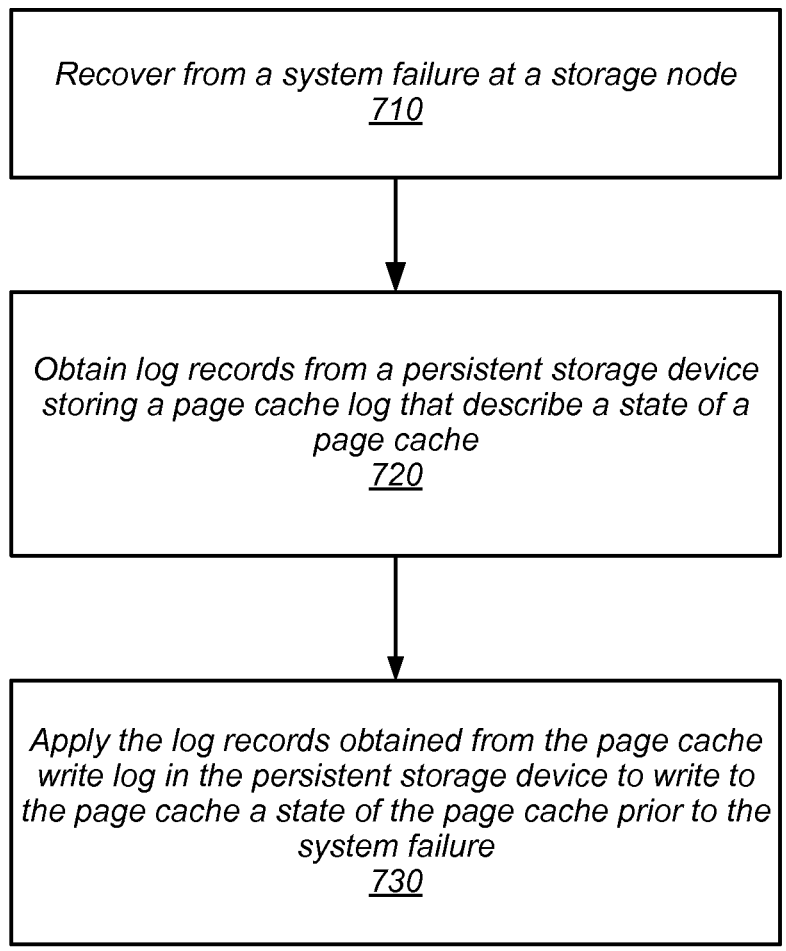
FIG. 7 is a high-level flowchart illustrating various methods and techniques for page cache recovery from a page cache write log, according to some embodiments.

As noted above, preserving log records in a page cache write log may allow for a state of the page cache prior to a system failure causing data loss in the page cache to be restored to the page cache. FIG. 7 is a high-level flowchart illustrating various methods and techniques for page cache recovery from a page cache write log, according to some embodiments. As indicated at 710, recovery from a system failure may occur at a storage node. A system failure may generally be any failure that causes a loss of data in the page cache in system memory, such as a power or software failure. Upon recovery, log records stored in the persistent storage device storing the page cache write log that describe the state of the page cache may be obtained, as indicated at 720. For example, the log records may be read sequentially from the page cache log as part one or more different recovery operations, routines, or processes for the storage node maintaining the data volume.

As indicated at 730, the log records obtained from the page cache write log may be applied to write to the page cache a state of the page cache prior to the system failure. For example, as the log records describe the updates to the page cache log, the log records may be replayed in sequence, recreating the updates to the page cache in order to restore the state of the page cache, in some embodiments. In some embodiments, the log records may be dependent on or independent of prior log records in the page cache write log. Once restored, the storage node may be made available for processing I/O requests, in some embodiments.

Figure 8:
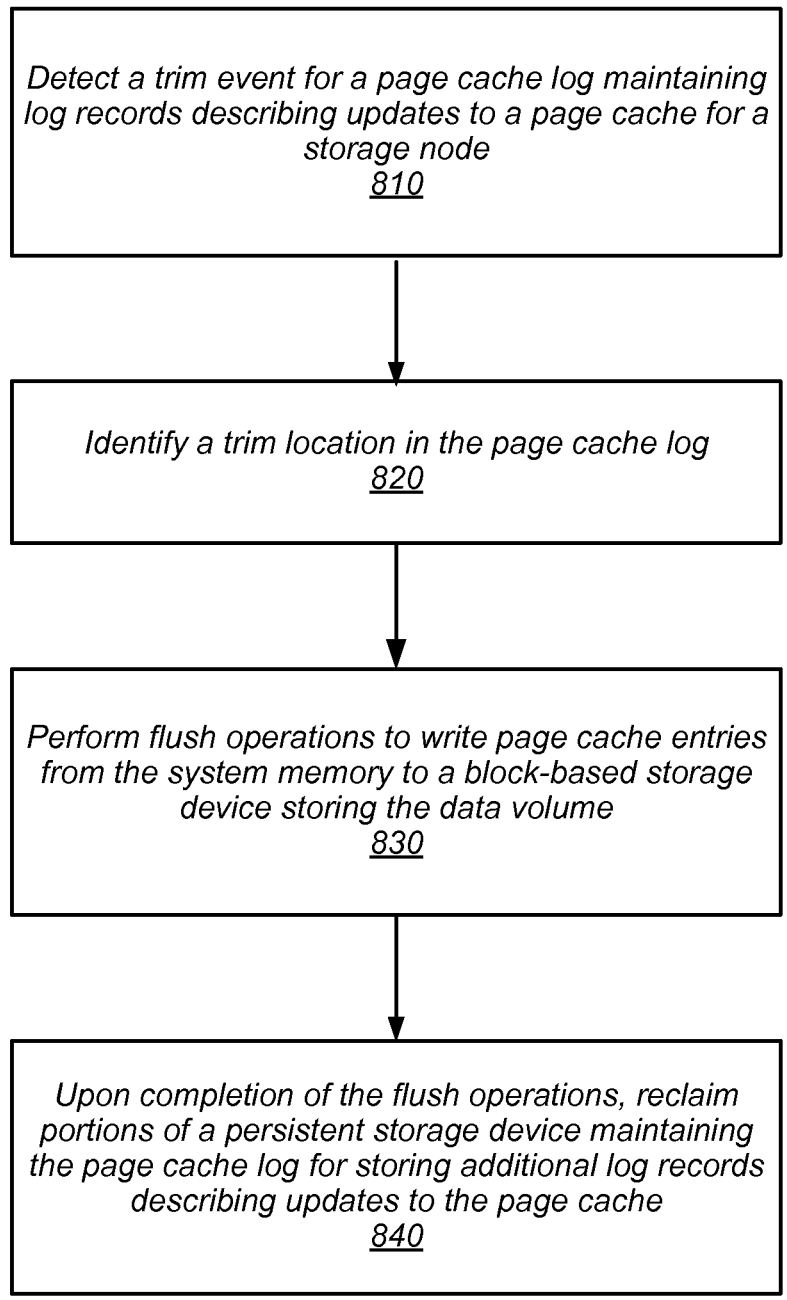
FIG. 8 is a high-level flowchart illustrating various methods and techniques for trimming a page cache write log, according to some embodiments.

Over time even a large page cache write log may become full, as write requests may occur very frequently, in various embodiments. FIG. 8 is a high-level flowchart illustrating various methods and techniques for trimming a page cache write log, according to some embodiments. As indicated at 810, a trim event may be detected for a page cache log maintaining log records describing updates to a page cache for a storage node. A trim event may be an indication or a determination that available storage space in the page cache write log has exceed some threshold. Other indications or determinations may be additionally, or alternatively, used. For example, a timer or other indication that an amount of time elapsed since a previous trim event may trigger a trim event. In some embodiments, a trim event may be detected when a page cache flush of dirty pages has occurred such that a contiguous portion of log records in the page cache write log may no longer be necessary to persist.

In response to detecting the trim event for the page cache log, a trim location in the page cache log may be identified. The trim location may be the current location in the log at the time of the trim event. The trim event location may be saved or recorded elsewhere while trimming is performed. As indicated at 830, flush operations may be performed to write page cache entries from the system memory to block-based storage devices storing the data volume, in various embodiments. Flush operations may write the contents of portions of the page cache to their corresponding locations in the block-based storage devices. In some embodiments, only those portions of the page cache that have been modified (i.e. dirty) may be flushed.

In at least some embodiments, a determination as to the size of the page cache flush operations may be made. For example, during the performance of flush operations write requests to the flushed portion of the page cache are blocked. The size of the portion of flushed area may be adjusted depending on the speed with which the log needs to be trimmed in contrast with the latency added to certain write requests that are blocked. For instance, if write requests that would be written to a portion of the page cache that is within a flushed area of a flush operation, then the size of the portion of the flushed area may increase or decrease the latency for pending write requests by increasing or decreasing the possibility that a particular write request may be blocked. Upon completion of the flush operations, portions of the persistent storage device maintaining the page cache log may be reclaimed for sting additional log records describing updates to the page cache, as indicated at 840.

Figure 9:
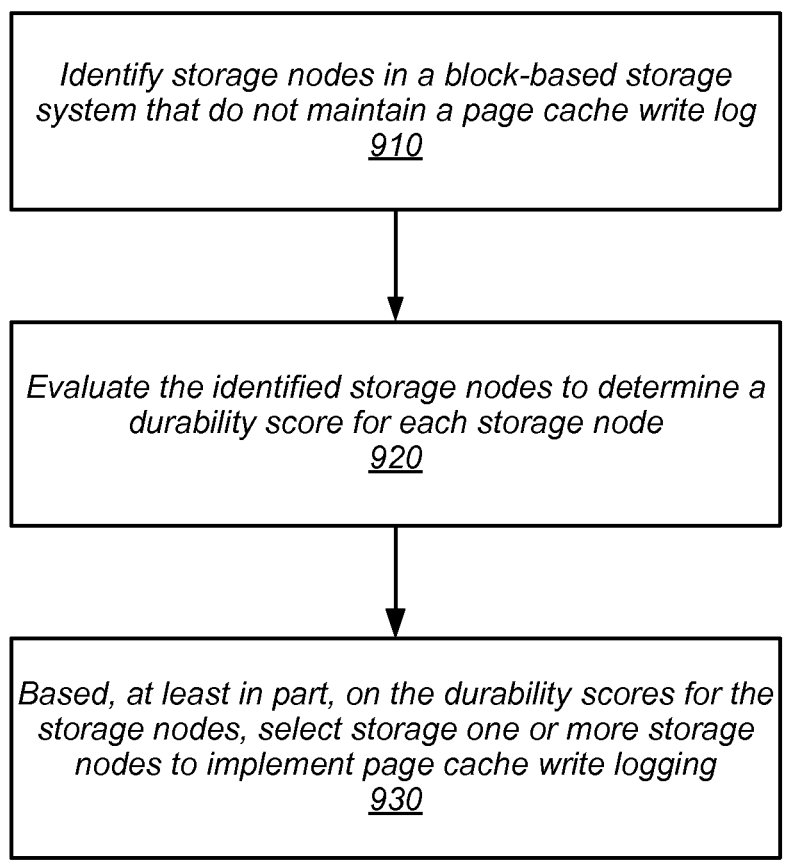
FIG. 9 is a high-level flowchart illustrating various methods and techniques for deploying page cache write logging techniques, according to some embodiments.

In some embodiments, a control plane or other system component may direct the deployment, implementation, and/or enablement of page cache write logging for storage nodes maintaining data volumes in block-based storage. FIG. 9 is a high-level flowchart illustrating various methods and techniques for deploying page cache write logging techniques, according to some embodiments. As indicated at 910, storage nodes in a block-based storage system may be identified that do not maintain a page cache write log. For example, system level metadata may be maintained indicating the version, configuration, or status of storage nodes, including whether or not page cache write logging is implemented. As indicated at 920, the identified storage nodes may be evaluated to determine a durability score for each storage node. For example, if a particular storage node is implemented in a data center or other physical or geographical location that is prone to power failure, such information may lower a durability score for the storage node. Similarly, if a majority of peers in a same data center or geographical location have implemented page cache write logging, then the durability score may be raised. Many other factors may influence the durability score for a storage node, such as whether or not a majority of data volumes maintained on the storage node have replicas on other storage nodes with page cache write logging enabled. Different weightings, combinations, or other calculations dependent of these various factors may be used to determine a durability score for a particular storage node. Thus, the previous examples are not intended to be limiting as to the various other factors that may influence the durability score.

As indicated at 930, based on the durability scores for the storage nodes, a one or more storage node may be selected to implement page cache write logging, in various embodiments. Such selections may be provided to various different block-based storage service administration or management interfaces according to different communication mechanisms. In some embodiments, the techniques illustrated in FIG. 9 may be performed periodically or a periodically for a given subset of storage nodes implementing a block-based storage service (e.g., a particular room, data center, or other geographic location or grouping) or an entire fleet of storage nodes implementing a block-based storage service. Each iteration of the method in FIG. 9 may be allotted pre-defined number of deployments, in some embodiments, and thus the storage nodes may be selected based on durability score until the number of available deployments are assigned.

Page cache write logging may increase the durability of data volumes maintained at a storage node, in various embodiments. By storing log records in a page cache write log, the state of the page cache may be able to be restored in the event of a system failure. However, in some embodiments, the increased burden of performing page cache write logging may exceed the capabilities of persistent storage devices maintaining the page cache write log or hamper the performance of write requests. Allowing more fine-grained page cache write logging may allow for a storage node to effectively tune its performance to maximize durability and minimize latency. FIG. 10 is a high-level flowchart illustrating various methods and techniques for dynamically modifying durability properties for data volumes maintained at a storage node, according to some embodiments.

As indicated at 1010, a page cache write log storing log records describing updates to a page cache may be maintained for write requests received at a storage node maintaining multiple data volumes, in various embodiments. A page cache write log may be maintained in a persistent storage device, as discussed above. The persistent storage device may be a block-based storage device, such as a hard disk drive or solid state drive. In some embodiments, the persistent storage device may be a non-volatile random access memory device (NV-RAM). Log records may be written and/or stored in the persistent storage device sequentially, in order to decrease write latency. Log records for different data volumes may be stored based on when the write request was performed to update the page cache, and may not, in some embodiments, be grouped or stored with log records for the same data volume.

As indicated at 1020, a rate of incoming write requests to the storage node that are to be logged in the page cache write log may be monitored, in various embodiments. As discussed below with regard to FIG. 11, the rate may, in some embodiments, be a simple measure of the number of write requests received within a period of time that are to be logged. The rate may also be converted into a measure that indicates the amount of work to be performed in order to perform the write requests (e.g., input/output operations per second (IOPS)). Monitoring of the write requests may be performed continually, periodically, or aperiodically, in various embodiments.

As indicated at 1030, based, at least in part, on the rate of incoming write requests to the storage node that are to be logged, a durability property for one (or more) of the data volumes may be dynamically modified. The durability property may indicate, in various embodiments, whether page cache write logging is enabled or disable for the data volume. Thus, by modifying the durability property, write requests directed toward a particular data volume may be logged or not logged, depending on a current state of the durability property for the data volume at the time a write request is received. In some embodiments, dynamic modifications may include all of the data volumes maintained at a storage node. For example, page cache write logging may be disabled (or enabled) for all data volumes, in some embodiments.

Monitoring the rate of incoming write requests to a storage node may allow a storage node to adapt to changing conditions, such as a dramatic increase or decrease in the number of received write requests. FIG. 11 is a high-level flowchart illustrating various methods and techniques for determining whether to enable or disable page cache write logging for data volumes, according to some embodiments. The rate of incoming write requests may be used to take ameliorative actions, or to maximize performance and/or durability for data volumes maintained at a storage node.

As indicated at 1110, a rate of incoming write requests to a storage node 110 that are to be logged to a page cache write log may be determined. This rate may, in some embodiments, be a simple measure of the number of write requests received within a period of time. The rate may also be converted into a measure that indicates the amount of work to be performed in order to perform the write requests (e.g., input/output operations per second (IOPS)). Once determined, the rate of incoming write requests may be compared with logging rate ceiling, as indicated at 1120. A logging rate ceiling, may be determined or configured to correspond to some throughput capability of a persistent storage device implementing the page cache write log, in some embodiments. For example, if a hard disk drive can perform at a maximum 8000 IOPS, then the logging rate ceiling may be determined to be some number at or below the maximum throughput of the hard disk drive (e.g., 7000 IOPS). In some embodiments, the logging rate ceiling may be set lower than the maximum throughput of the persistent storage device in order to allow dynamic modifications of durability properties time to lower the current rate without exceeding the throughput capacity of the device (which may cause log record loss or blocked write requests—as write requests may be blocked until the page cache write log can catch up).

If a determined rate of incoming write requests exceeds a logging rate ceiling, as indicated by the positive exit from 1120, a selection of one or more data volumes may be made to disable page cache write logging for the selected data volumes in order to lower the rate of incoming write requests that are to be logged below the logging rate ceiling. The selection of data volume may be made from the data volumes at the storage node that currently have page cache write logging enabled. For instance, if 8 out of the 10 data volumes have page cache write logging enabled, the selection may be made from the 8 out of 10 data volumes.

The selection may be made based on several different factors. For example, the selection may be based on the size of each data volume. For example, the largest data volume may receive a disproportionately large amount of write requests. The selection may also be made based on the number of write requests that are directed toward a particular data volume. For instance, if a data volume, though small, receives frequent write requests, the small data volume may push the rate of incoming write requests to be logged in excess of the rate ceiling. Based on these and various other factors, one or more data volumes may be selected. For example, data volumes may have an estimated rate of write requests associated with each data volume. Data volumes may continue to be selected until an estimated rate of write requests for the selected data volumes lowers the rate of incoming write request to an acceptable amount. In some embodiments, an ordering or priority scheme of data volumes may be enforced in order to select some data volumes over others. For example, in some embodiments, durability properties for replicas of the data volumes maintained at other storage nodes may be known. Thus if, a particular data volume has a higher number of write requests than another data volume, but the particular data volume also only has page cache write logging at this storage node (and not at other storage nodes where replicas are maintained), then the particular data volume may be excluded or lowered in the ordering or priority scheme for selection. Once selected, page cache write logging for the selected data volume may be disabled, as indicated at 1140.

In some embodiments, the rate of incoming write requests that are to be logged in a page cache write log may also be compared to a logging rate floor, as indicated at 1150. Similar to the analysis discussed above, with regard to the logging rate ceiling, a logging rate floor may indicate that rate of incoming write requests for which the storage node may be able enable page cache write logging for additional. For example, the logging rate floor may be determined or set based on an average number of write requests per volume such that a rate below the logging rate floor indicates that a likely or historically average data volume may have write logging enabled without exceeding the logging rate ceiling 1120.

A selection of a data volume (or data volumes) may be made from those data volumes which have page cache write logging disabled. As discussed above, the selection may be based on the size of each data volume. For example, the smallest data volume may receive a disproportionately small amount of write requests. The selection may also be made based on the number of write requests that are directed toward a particular data volume. For instance, if a data volume, though large, historically receives an infrequent number of write requests, the large data volume may not push the rate of incoming write requests to be logged in excess of the logging rate ceiling. Based on these and various other factors, one or more data volumes may be selected, as indicated at 1160. For example, data volumes may have an estimated rate of write requests associated with each data volume. Data volumes may continue to be selected until an estimated rate of write requests for the selected data volumes raises the rate of incoming write requests to be above the logging rate floor. In some embodiments, an ordering or priority scheme of data volumes may be enforced in order to select some data volumes over others. For example, in some embodiments, durability properties for replicas of the data volumes maintained at other storage nodes may be known. Thus if, a particular data volume has a higher number of write requests than another data volume, but the particular data volume also does not have page cache write logging enabled at any storage node (where replicas of the data volume are maintained), then the particular data volume may be favored in the ordering or priority scheme for selection. Once selected, page cache write logging for the selected data volume may be enabled, as indicated at 1170.

The negative exit from 1150 back to 1110 indicates that this evaluation may be performed repeatedly while the rate incoming write requests are monitored, in various embodiments. In this way, adjustments to the durability properties of data volumes may be made over time.

Figure 12:
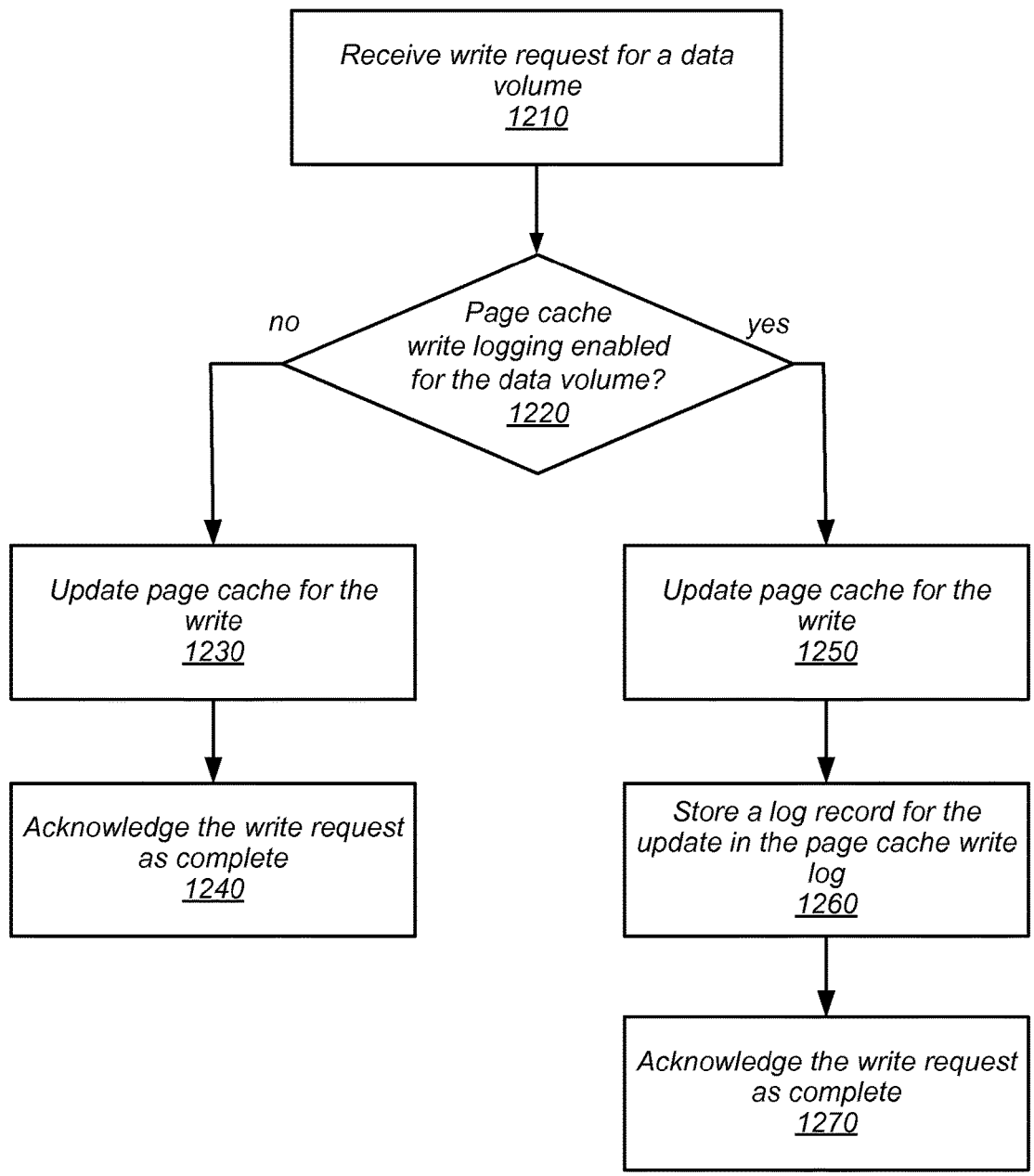
FIG. 12 is a high-level flowchart illustrating various methods and techniques processing write requests at a storage node for a particular data volume according to the durability properties of the particular data volume, according to some embodiments.

As durability properties for data volumes maintained at a storage node may be dynamically changed over time, write request for the same data volume may be processed with page cache write logging at one time and without page cache write logging at another time. FIG. 12 is a high-level flowchart illustrating various methods and techniques processing write requests at a storage node for a particular data volume according to the durability properties of the particular data volume, according to some embodiments.

As indicated at 1210, a write request may be received for a data volume. Metadata or other information may be maintained at the storage node indicating the durability properties of data volumes. The metadata may be evaluated to determine whether page cache write logging is enabled for the data volume, as indicated at 1220. If yes, then the page cache may be updated for the write, as indicated at 1250, and a log record describing the update to the page cache may be stored in the page cache write log at the storage node, as indicated at 1260. As noted above with regard to FIG. 6, in some embodiments the update to the page cache for the write 1250 and the storage of the log record in the page cache write log 1260 may be performed in parallel or near parallel (e.g., started at the same time, but one operation finishes before the other). Once the page cache is updated and the log record stored, the write request may be acknowledged as complete, as indicated at 1270. If page cache write logging is not enabled for the data volume, as indicated by the negative exit from 1220, then the page cache may be updated for the write request, as indicated at 1230, and the write request acknowledged as complete, as indicated at 1240, without storing a log record in the page cache write log.

Figure 13:
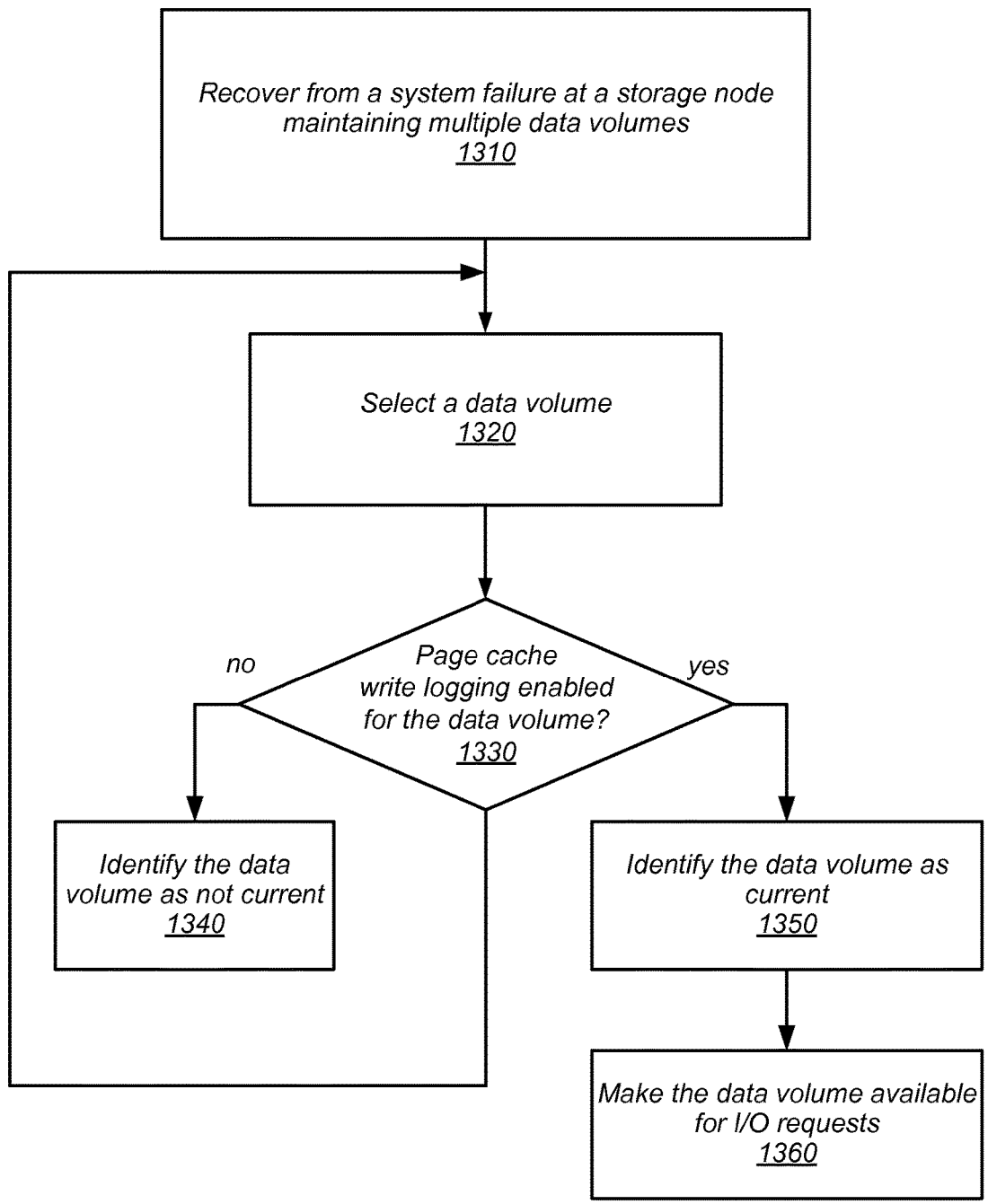
FIG. 13 is a high-level flowchart illustrating various methods and techniques for data volume recovery with enabled and disabled write logging, according to some embodiments.

As discussed above with regard to FIG. 7, log records in a page cache write log may be replayed to restore to a page cache a state of the page cache prior to a system failure. In this way, write requests that were acknowledged as completed may not be lost, even though the page cache may not have yet flushed page cache entries to the block-based storage devices maintaining data volumes. Therefore, a current version of a data volume may be retained based on the data volume as stored in the block-based storage devices and as described in the page cache write log. Since page cache write logging may be enabled and disable for particular data volumes at a storage node, some data volumes on a storage node may be current, while others may not. FIG. 13 is a high-level flowchart illustrating various methods and techniques for data volume recovery with enabled and disabled write logging, according to some embodiments.

As indicated at 1310, a storage node may recover from a system failure. The storage node may maintain multiple data volumes. In order to perform additional recovery operations, data volumes may be evaluated to identify those data volumes with page cache write logging enabled. As indicated at 1320, a particular data volume may be selected. The durability property for the data volume may be used to determine whether page cache write logging was enabled for the data volume, as indicated at 1330. If yes, as indicated by the positive exit, the data volume may be identified as current, as indicated at 1350, and may be made available for I/O requests, as indicated at 1360. For example, if a particular data volume is identified as current, then a block-storage service control plane, or the storage node itself, may identify a new role for the data volume in a durability scheme, such as identifying the storage node as a master storage node for the data volume. The identified master storage node may then acquire one or more slave storage nodes to maintain a new replica of the data volume, and replicate the data volume to the slave storage nodes. Alternatively, in some embodiments, storage node may begin processing I/O requests for the current data volume without obtaining any peer or slave storage nodes. Any other recovery operations for a current data volume may also be performed to prepare the data volume for I/O requests. If, however, page cache write logging is not enabled for the data volume, as indicated by the negative exit from 1330, then the data volume may be identified as not current, as indicated at 1340. Data volumes that are not current may be subjected to extra recovery operations, such as waiting for another storage node maintaining a replica of the data volume to identify whether it maintains a current version of the data volume. In some embodiments, data volumes not identified as current may be deleted or removed from block-based storage devices at a storage node.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers, storage nodes, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 14:
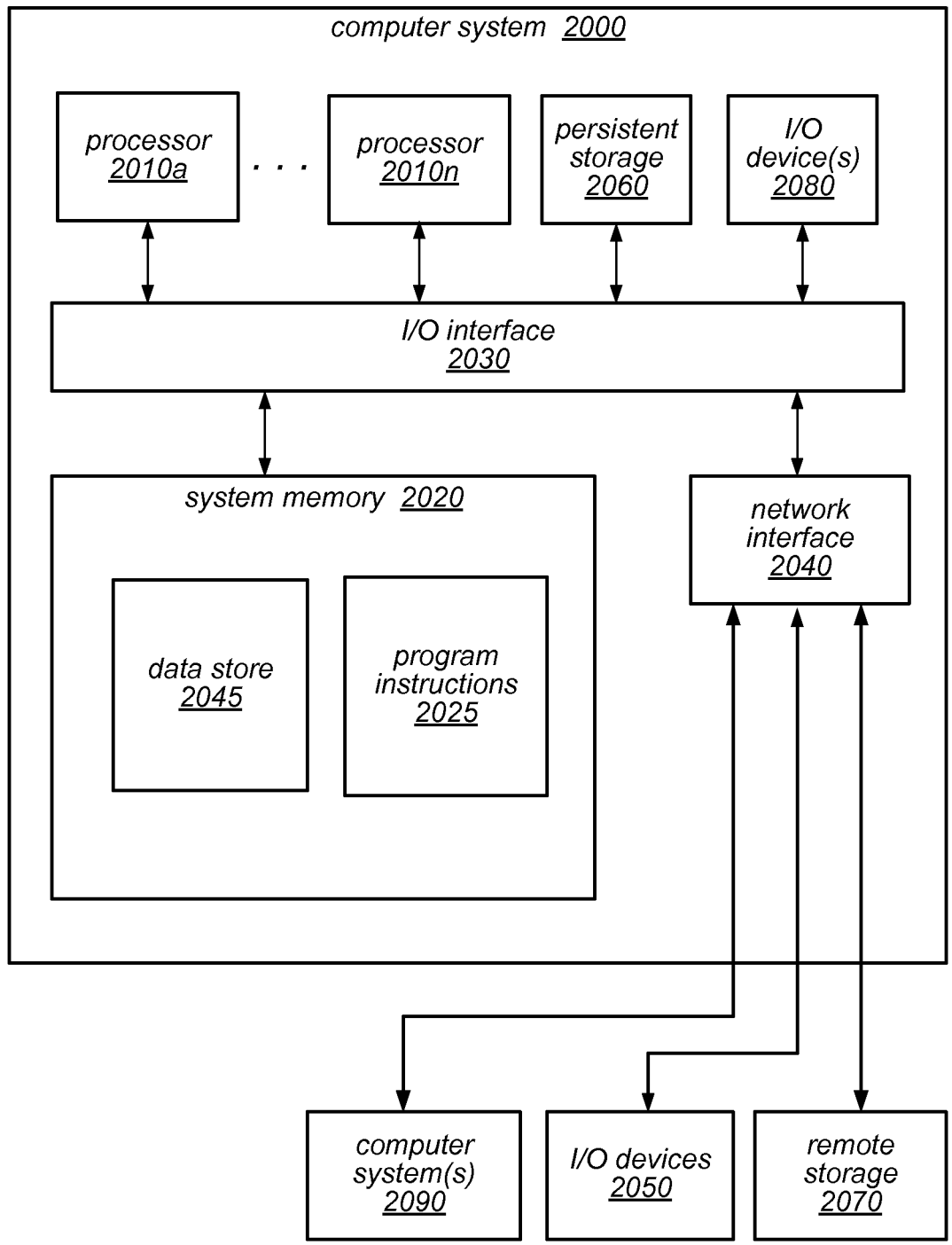
FIG. 14 is a block diagram illustrating an example computing system, according to some embodiments.

Embodiments of page cache write logging for block-based storage as described herein may be executed on one or more computer systems, which may interact with various other devices. FIG. 14 is a block diagram illustrating an example computer system, according to various embodiments. For example, computer system 2000 may be configured to implement storage and/or compute nodes of a compute cluster, a data stores, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, block-based storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a storage node, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090, for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 142000 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system implementing a storage node, comprising:
one or more block-based storage devices maintaining one or more data volumes;
a system memory, comprising a page cache, wherein the page cache is periodically or aperiodically flushed to the one or more block-based storage devices in order to persistently update the one or more data volumes;
a persistent storage device maintaining a page cache write log, wherein the page cache write log maintains a plurality of log records describing updates to the page cache, wherein the plurality of log records are applicable to restore a prior state to the page cache in the event of a system failure resulting in a loss of data in the page cache;
the storage node, configured to:
receive a write request for a particular data volume of the one or more data volumes;
update at least one corresponding entry of a plurality of entries in the page cache for the write request;
store a log record describing the update to the at least one corresponding page cache entry in the page cache write log; and
in response to updating the page cache entry and storing the log record in the page cache write log, acknowledge the write request as complete;

wherein the storage node is one of two or more storage nodes that maintain replicas of the data volume, wherein another one of the two or more storage nodes does not maintain a respective page cache write log for write requests with respect to the data volume.

2. The system of claim 1, wherein the storage node is further configured to:
upon recovery from a system failure:
obtain from the persistent storage device maintaining the page cache write log, the log record and the plurality of log records; and
apply the log record and the plurality of log records maintained in the page cache write log to write to the page cache a state of the page cache prior to the system failure.

3. The system of claim 1, wherein storage node is further configured to:
detect a trim event for the page cache write log;
in response to detecting the trim event:
identify a trim location in the page cache write log;
perform one or more flush operations to write at least some of the plurality of page cache entries from the system memory to the one or more block-based storage devices; and
upon completion of the one or more flush operations, reclaim one or more portions of the persistent storage device maintaining the page cache write log for storing additional log records describing updates to the page cache.

4. The system of claim 1, wherein the storage node is implemented as part of a network-based block-based storage service, wherein a least one other storage node implemented as part of the block-based storage service maintains a replica of the particular data volume, and wherein the at least one other storage node is configured to perform said receive, said store, said update, and said acknowledge.

5. A method, comprising:
performing, by one or more computing devices:
receiving, at a storage node, a write request for a data volume persisted in at least one block-based storage device maintained at the storage node;
updating at least one corresponding entry of a plurality of entries in a page cache maintained in system memory at the storage node for the write request, wherein the plurality of entries in the page cache are periodically or aperiodically flushed to the at least one block-based storage device in order to persistently update the data volume;
storing a log record describing the update to the at least one corresponding page cache entry in a page cache write log maintained in a persistent storage device along with a plurality of other log records maintained in the persistent storage device, wherein the log record and the plurality of other log records describe a state of the page cache including the updated page cache entry to be restored to the page cache in the event of a system failure resulting in a loss of data in the page cache; and
in response to updating the page cache entry and storing the log record in the page cache write log, acknowledging the write request as complete;
wherein the storage node is one of two or more storage nodes that maintain replicas of the data volume, wherein another one of the two or more storage nodes does not maintain a respective page cache write log for write requests with respect to the data volume.

6. The method of claim 5, further comprising:
upon recovery from a system failure:
obtaining from the persistent storage device maintaining the page cache write log, the log record and the plurality of other log records; and
applying the log record and the plurality of other log records maintained in the page cache write log to write to the page cache a state of the page cache prior to the system failure.

7. The method of claim 6, further comprising:
upon recovery from a system failure of the two or more storage nodes, identifying one of the two or more storage nodes that maintains the respective page cache write log as maintaining a current replica of the data volume prior to the system failure in order to make the current replica of the data volume available for processing subsequent input/output requests for the data volume.

8. The method of claim 5, further comprising:
detecting a trim event for the page cache write log;
in response to detecting the trim event:
identifying a trim location in the page cache write log;
performing one or more flush operations to write at least some of the plurality of page cache entries from the system memory to the at least one block-based storage device; and
upon completion of the one or more flush operations, reclaiming one or more portions of the persistent storage device maintaining the page cache write log for storing additional log records describing updates to the page cache.

9. The method of claim 8, further comprising:
in response to detecting the trim event, determining a flush operation size for the one or more flush operations.

10. The method of claim 5, wherein the at least one block-based storage device is at least one of a plurality of block-based storage devices maintained at the storage node, and wherein the method further comprises:
receiving another write request for another data volume persisted in at least one other block-based storage device of the plurality of block-based storage devices maintained at the storage node; and
performing said updating, said storing, and said acknowledging for the other write request.

11. The method of claim 5, wherein the one or more computing devices implement a storage node of a plurality of storage nodes that together implement a block-based storage service, wherein the storage node is one of one or more storage nodes in the block-based storage service that implement page cache write logging, wherein other ones of the plurality storage nodes do not implement page cache write logging, and wherein the method further comprises:
performing, by one or more computing devices implementing a block-based storage service control plane:
evaluating the other ones of the plurality of storage nodes to determine a durability score for each other storage node that does not implement page cache write logging; and
based, at least in part on the durability scores, selecting one or more storage nodes of the other storage nodes to implement page cache write logging.

12. The method of claim 5, wherein the storage node is one of a plurality of storage nodes implementing a network-based block-based storage service, wherein the write request is received from a virtual compute instance implemented by a network-based virtual compute service, wherein the network-based block-based storage service and the network-based virtual compute service are implemented together as part of a same network-based services provider network.

13. A non-transitory, computer-readable storage medium, storing program instructions that when executed by one or more computing devices cause the one or more computing devices to implement:

receiving, at a storage node, a write request for a data volume persisted in at least one block-based storage device maintained at the storage node;

updating at least one corresponding entry of a plurality of entries in a page cache maintained in system memory at the storage node for the write request, wherein the plurality of entries in the page cache are periodically or aperiodically flushed to the at least one block-based storage device in order to persistently update the data volume;

storing a log record describing the update to the at least one corresponding page cache entry in a page cache write log maintained in a persistent storage device along with a plurality of other log records maintained in the persistent storage device that is different than the at least one block-based storage device, wherein the log record and the plurality of other log records describe a state of the page cache including the updated page cache entry to be restored to the page cache in the event of a system failure resulting in a loss of data in the page cache; and in response to updating the page cache entry and storing the log record in the page cache write log, acknowledging the write request as complete;

wherein the storage node is one of two or more storage nodes that maintain replicas of the data volume, wherein another one of the two or more storage nodes does not maintain a respective page cache write log for write requests with respect to the data volume.

14. The non-transitory, computer-readable storage medium of claim 13, wherein the program instructions further cause the one or more computing devices to implement:

upon recovery from a system failure:
obtaining from the persistent storage device maintaining the page cache write log, the log record and the plurality of other log records; and
applying the log record and the plurality of other log records maintained in the page cache write log to write to the page cache a state of the page cache prior to the system failure.

15. The non-transitory, computer-readable storage medium of claim 14, wherein the one or more computing devices implement a master storage node and one or more slave storage nodes, wherein the master storage node and the one or more slave storage nodes each maintain a respective replica of the data volume, and wherein the master storage node and the one or more slave storage nodes each perform said receiving, said storing, said updating, and said acknowledging.

16. The non-transitory, computer-readable storage medium of claim 13, wherein the program instructions further cause the one or more computing devices to implement:

detecting a trim event for the page cache write log;
in response to detecting the trim event:
identifying a trim location in the page cache write log;
performing one or more flush operations to write at least some of the plurality of page cache entries from the system memory to the at least one block-based storage device; and
upon completion of the one or more flush operations, reclaiming one or more portions of the persistent storage device maintaining the page cache write log for storing additional log records describing updates to the page cache.

17. The non-transitory, computer-readable storage medium of claim 16, wherein the program instructions further cause the one or more computing devices to implement:

in response to detecting the trim event, determining a flush operation size for the one or more flush operations.

18. The non-transitory, computer-readable storage medium of claim 13, wherein the at least one block-based storage device is at least one of a plurality of block-based storage devices maintained at the storage node, and wherein the program instructions further cause the one or more computing devices to implement:

receiving another write request for another data volume persisted in at least one other block-based storage device of the plurality of block-based storage devices maintained at the storage node; and performing said updating, said storing, and said acknowledging for the other write request.

19. The non-transitory, computer-readable storage medium of claim 13, wherein the storage node is one of a plurality of storage nodes implementing a network-based block-based storage service, wherein each of the plurality of storage nodes maintains a plurality of different data volumes for a plurality of different clients.

* * * * *